United States Patent

[11] 3,571,529

[72] Inventors Iraj Gharib
Glenview;
William H. Greenbaum, Oak Park, Ill.
[21] Appl. No. 758,272
[22] Filed Sept. 9, 1968
[45] Patented Mar. 16, 1971
[73] Assignee Zenith Radio Corporation
Chicago, Ill.

[54] HEARING AID WITH FREQUENCY-SELECTIVE AGC
1 Claim, 11 Drawing Figs.

[52] U.S. Cl. .......... 179/107
[51] Int. Cl. .......... H04r 25/00
[50] Field of Search .......... 179/1 (A), 107, 1 (F); 325/400, 408

[56] References Cited
UNITED STATES PATENTS

| | | | |
|---|---|---|---|
| 3,112,461 | 11/1963 | DeJager et al. | 325/400 |
| 3,229,049 | 1/1966 | Goldberg | 179/107 |
| 3,349,173 | 10/1967 | Caprio | 325/408 |
| 2,843,671 | 7/1958 | Wilkins | 179/1F |
| 3,124,760 | 3/1964 | Dijkstra | 179/107X |
| 3,209,083 | 9/1965 | Posen | 179/107 |

*Primary Examiner*—Kathleen H. Claffy
*Assistant Examiner*—William A. Helvestine
*Attorney*—John J. Pederson

ABSTRACT: A hearing aid wherein automatic gain control (AGC) is provided by using an AGC system incorporating a user-variable, frequency-selective amplifier to simultaneously establish an adequate range of AGC control voltage and enable selection of the frequencies to which the AGC system responds. The control circuit comprises a frequency-selective network, an amplifier, and a rectifier connected in cascade to limit the gain of the hearing aid only in response to received audio sound waves of frequencies within a selected portion of the frequency response range of the hearing aid.

Inventors
Iraj Gharib
William H. Greenbaum
By [signature]
Attorney

Inventors
Iraj Gharib
William H. Greenbaum
By [signature] Attorney

Inventors
Iraj Gharib
William H. Greenbaum
By
Attorney

HEARING AID WITH FREQUENCY-SELECTIVE AGC

BACKGROUND OF INVENTION

The desirability of incorporating automatic gain control, also referred to herein as AGC, in a hearing aid amplifier is well known. In the absence of such control, the hearing aid amplifier is usually designed to achieve the maximum degree of amplification of which it is capable. Consequently, relatively low magnitude audio signals are amplified sufficiently to enable the hearing aid user to hear these sounds at a normal level. Relatively large audio signals, however, are also amplified to the same degree and are therefore much too strong at the output stage of the hearing aid. This overdriving of the output stage results in an annoying distortion of the audio signal and sometimes even in extremely loud sounds which are painful to the ear.

A volume control partially alleviates this problem in that the user may adjust the gain of the aid to suit the average audio level of his immediate environment. The volume control does not, however, provide any safeguard against sudden bursts of loud sounds. An AGC circuit, on the other hand, controls the gain of the amplifier according to the magnitude of the audio signal being received by the aid, thereby protecting the user from sudden, loud sounds.

Another desirable feature for a hearing aid is for the user to be able to control the frequency response of the hearing aid. Hearing deficiencies vary widely from person to person, both as to the amount of hearing loss and as to the frequency at which the loss occurs. For example, a typical hearing deficiency entails the situation in which the deficient ear has a more severe loss at high audio frequencies than at low audio frequencies. Consequently, for this user, the low-frequency signals are amplified too much when the high-frequency signals are amplified to a normal listening level. This results in annoying, abnormal hearing for the user. By incorporating a tone control in a hearing aid, the user may adjust the frequency response of the amplifier to suit his particular hearing deficiency. Here, he would adjust the tone control to decrease the gain of the amplifier at low frequencies.

The conventional tone control does not, however, completely solve this problem inasmuch as it provides a constant decrease in amplitude (or "roll-off") for the range of frequencies which it controls. Consequently, a user with the above-mentioned hearing deficiency situated in an environment subject to relatively frequent, loud low-frequency sounds sets this tone control to "roll-off" the low-frequency sounds in order to protect himself from the loud, low-frequency sounds. Because of the constant "roll-off" effect of the conventional tone control, however, this also decreases the low-frequency response of the hearing aid amplifier during the absence of these loud, low-frequency sounds. Hence, a conventional hearing aid amplifier does not achieve its optimum frequency response during these periods of time and thereby fails to provide the user with the maximum degree of intelligibility which it is capable of producing.

Furthermore, the incorporation of both a conventional tone control and an automatic gain control (AGC) circuit in a hearing aid still does not completely solve this problem. True, the AGC portion of such a combination protects the user from a sudden, loud low frequency sound and the tone control permits variation of the frequency response of the hearing aid. Nevertheless, the AGC circuit also limits the gain of the hearing aid upon receiving a loud, high-frequency sound—the type of sound that the user in the example above needs to have amplified the most—and the tone control constantly limits the frequency response of the hearing aid.

Still another important design consideration of a high quality hearing aid is its size. Despite the increasing public acceptance of hearing aids, compact size is still desirable with respect to convenience, directivity, and the elimination of clothing noise. With this in mind, it quite obviously is desirable to manufacture a hearing aid with a maximum degree of miniaturization.

It is therefore a principal object of the present invention to provide a new and improved wearable electronic hearing aid which overcomes one or more of the above-mentioned disadvantages of prior art hearing aids.

It is another object of the invention to provide a new and improved hearing aid with a greater degree of intelligibility.

It is a further and more specific object of the invention to provide such a new and improved hearing aid with a minimum number of components in order to obtain a maximum degree of miniaturization.

SUMMARY OF THE INVENTION

A wearable electronic hearing aid constructed in accordance with the invention comprises a microphone for receiving ambient sound waves and converting them to audiofrequency electrical signals, a transistorized audio amplifier coupled to the microphone for amplifying the electrical signals, and an electromechanical transducer coupled to the amplifier for converting the amplified electrical signals into intelligible audio information at a power level higher than that of the ambient sound waves. The microphone, audio amplifier, and transducer are effective to produce amplification of sound waves of frequencies within a predetermined overall frequency response range, such as 200 to 4,000 Hertz. Also provided is an automatic gain control system coupled to the audio amplifier and responsive to electrical signals of an amplitude greater than a predetermined threshold for developing a control effect proportional to the amplitude and for utilizing the control effect to control the gain of the audio amplifier for signal amplitudes above the threshold. A frequency-selective network is included in the automatic gain control system for rendering the automatic gain control system selectively more responsive to signals of frequencies within a selected portion of the frequency response range (a 400 to 1,000 Hertz low-frequency range, for example, or a 1,000 to 4,000 Hertz high-frequency range) than to signals of other frequencies within the range.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in which like reference numerals identify like elements, and in which:

DESCRIPTION OF THE PREFERRED EMBODIMENT

Figure 1:
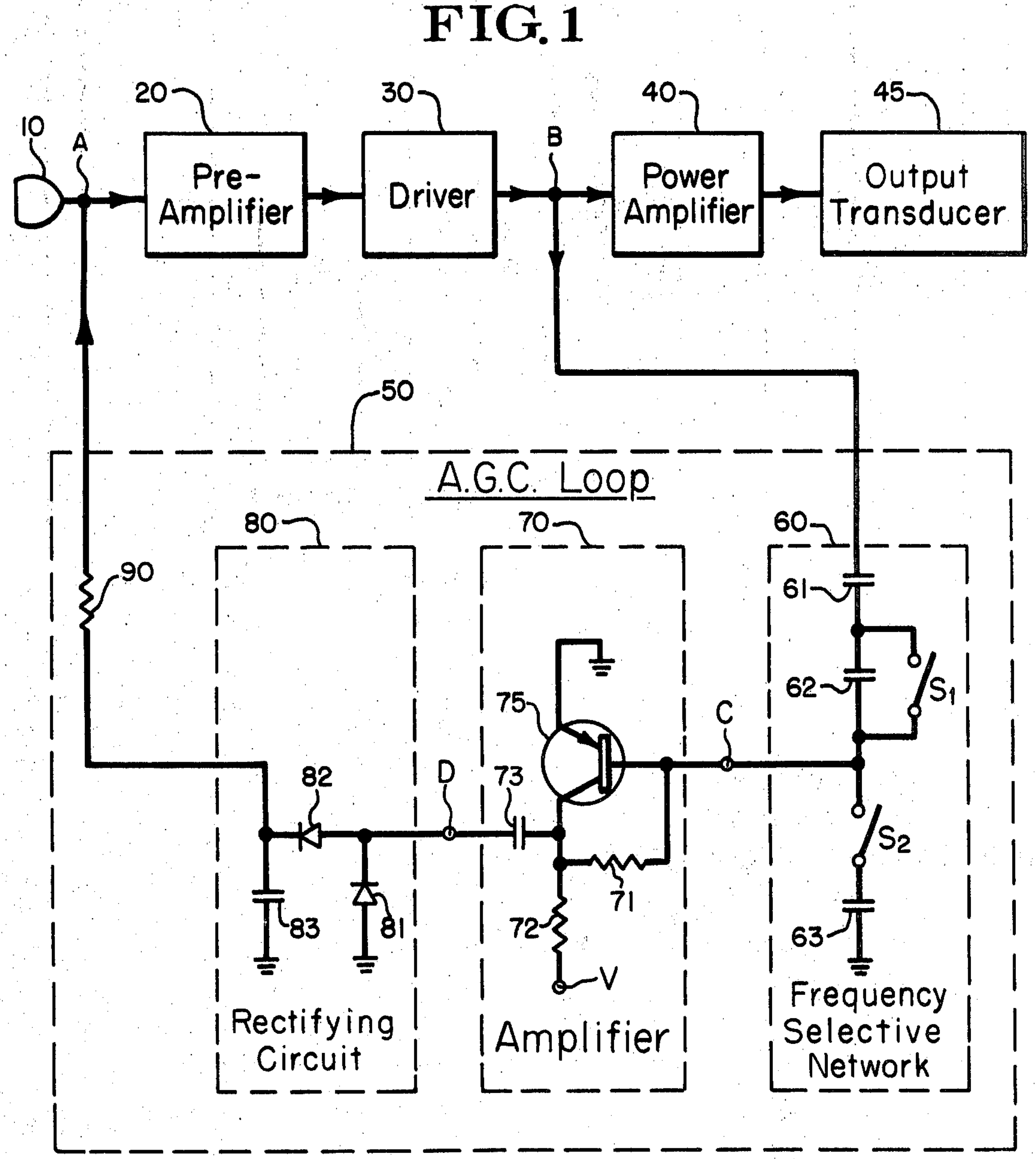
FIG. 1 is a schematic diagram of a hearing aid amplifier embodying the principles of the present invention.

With regard to FIG. 1, a new and improved wearable electronic hearing aid constructed in accordance with the invention is shown which comprises the series combination of a microphone 10, a preamplifier stage 20, a driver stage 30, a power amplifier stage 40, and an electromechanical output transducer 45. The microphone receives ambient sound waves and converts them into audiofrequency electrical signals which are coupled to the transistorized audio preamplifier. After being further increased in magnitude by the driver stage and power amplifier, the audio signals are converted into intelligible audio information by the transducer at an acoustic power level higher than that of the ambient sound waves. Similar to conventional hearing aids, the hearing aid in FIG. 1 is effective to produce amplification of sound waves of frequencies within a predetermined overall frequency response range; typically, a miniature head-worn hearing aid may have a useful frequency response range extending from 200 Hertz to 4,000 Hertz, for example.

In accordance with the invention, an automatic gain control (AGC) system 50 is provided between the output terminal B of the driver stage 30 and the input terminal A of the preamplifier stage 20. The AGC system comprises the series combination of a frequency-selective network 60, a transistor amplifier 70, and a rectifying circuit 80.

The frequency-selective network 60 comprises three capacitors 61, 62, and 63 and two switches, $S_1$ and $S_2$, as shown. For convenience, and by the use of known mechanisms (not shown), the switches may be mechanically connected such that all four possible combinations of these switches being open or closed may be selected by the movement of a single control member. That is, with one control, the user may select $S_1$ open and $S_2$ open, $S_1$ closed and $S_2$ open, $S_1$ open and $S_2$ closed, or $S_1$ closed and $S_2$ closed.

The amplifier 70 comprises a PNP transistor 75, a biasing resistor 71, a collector resistor 72 and a coupling capacitor 73 which is connected from the collector of transistor 75 to the input terminal D of the rectifying circuit 80. The emitter of transistor 75 is connected to ground and the base of the transistor, which constitutes the input terminal of the amplifier, is connected to a terminal C connected between switches $S_1$ and $S_2$. A DC supply voltage V is applied to the collector through resistor 72.

The rectifying circuit 80 consists of two diodes 81 and 82 and a capacitor 83. The output of the rectifying circuit is coupled to terminal A through resistor 90.

In operation, the AGC system 50 is responsive to the electrical signals at terminal B which are of an amplitude greater than a predetermined threshold and correspond to the received ambient sound waves. The frequency-selective network 60 renders the AGC system selectively more responsive to signals at terminal B which are of frequencies within a selected portion of the overall frequency response range of the hearing aid than to signals of other frequencies within the overall range. The amplifier 70, which provides an expanded control range of AGC, couples the signals selected by the network 60 to the rectifying circuit 80 wherein a proportional control effect is developed and applied to the input terminal A of the preamplifier. This control effect may, for example, be a variable DC bias signal which regulates the base-emitter voltage of the input transistor stage of the preamplifier. This controls the collector current of the input stage and thereby controls its gain.

In the embodiment of the invention illustrated in FIG. 1, the coupling capacity from terminal B to terminal C is varied by using different combinations of the capacitors 61, 62 and 63 as determined by selecting predetermined combinations of switches $S_1$ and $S_2$ being opened or closed. With both switches open, the series combination of capacitors 61 and 62 establishes a very small coupling capacity and the circuit 60 transmits only the high-frequency components of the signal appearing at terminal B. Hence, AGC action occurs only in response to loud, high-frequency sounds. A person with a low-frequency hearing deficiency using this hearing aid with this particular switch combination is not aggravated by extremely loud and/or distorted high-frequency sounds from the hearing aid. Instead, he is able to hear low-frequency sounds amplified to a maximum level, which is necessary to compensate his hearing deficiency, and he is protected from loud bursts of high-frequency sound such as a shrill whistle. In addition, he is able to enjoy the benefit of the full frequency response capability of the hearing aid during periods of normal-level sounds. Thus, this user is able to adjust his hearing aid to selectively control its gain only in response to high-frequency sounds and thereby obtain an optimum degree of intelligibility from it.

Closing $S_1$ and leaving $S_2$ open establishes a second switch combination which short-circuits capacitor 62 and thereby increases the coupling capacity of the circuit 60 from its value in the first combination. This increased capacity permits the entire audio frequency spectrum of signals appearing at terminal B to be transmitted by circuit 60, thus providing AGC action in response to input signals of any audio frequency. This switch combination selection enables a user who prefers to have AGC for all audio frequencies to adjust his hearing aid accordingly.

A third combination, when both switches $S_1$ and $S_2$ are closed, provides AGC action in response to low-frequency signals only. The closing of $S_2$ connects capacitor 63 from the input terminal C to ground, thereby bypassing to ground the high-frequency signals transmitted in the previous configuration and preventing the development of AC action in response to high-frequency signals. This mode is best suited for persons having the high-frequency hearing deficiency discussed previously inasmuch as it protects the user from loud, low-frequency sounds, provides maximum amplification for high-frequency sounds, and permits the utilization of the optimum frequency response capability of the aid during periods of normal level sounds. Thus, this user may also enjoy a maximum degree of intelligibility from the same hearing aid.

$S_1$ being open and $S_2$ closed constitutes the fourth possible combination and enables the user to operate the hearing aid without AGC. He desires such a provision when he uses the hearing aid in a very quiet environment which necessitates his using the maximum possible gain of the aid. The coupling capacity shown here is the same as in the first configuration, which transmits only high-frequency signals, however, the shunting path to ground provided by capacitor 63 bypasses these high-frequency signals to ground and thereby leaves no AC signals in the AGC loop 50 from which to develop a DC control effect. With no DC control effect developed, there is no AGC action and the amplifier operates at maximum gain for all audio input frequencies.

The embodiment of FIG. 1 is essentially similar to the circuitry of a commercialized version of the invention. Such a version, for example, has a predetermined overall frequency response range of 200 to 4,000 Hertz. By selecting each individual value of capacitors 61, 62, and 63 to be 0.1 AGC microfarads, the low-frequency AGC range becomes 200 to 1,000 Hertz and the high-frequency AGC range is 1,000 to 4,000 Hertz. It is understood, of course, that the above values are included solely for illustration purposes and in no sense impose a limitation in the invention.

Figure 2:
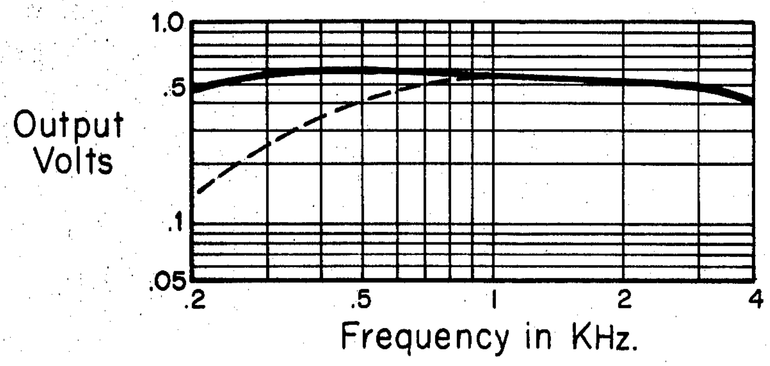
FIG. 2 is a graphical representation of the frequency response of a typical hearing aid amplifier.

In FIG. 2, a graphical representation of the frequency response of a typical hearing aid amplifier is illustrated by the solid-line curve. The dashed-line curve depicts the response of the hearing aid amplifier when it employs a conventional tone control which has been adjusted to the low-frequency "roll-off" position. This position provides the user with protection from loud, low-frequency sounds; however, it also requires the sacrificing of the maximum possible frequency response of the amplifier during the absence of such loud sounds. This necessarily results in a lesser degree of intelligibility for the user during periods of normal-level sounds.

Figure 3:
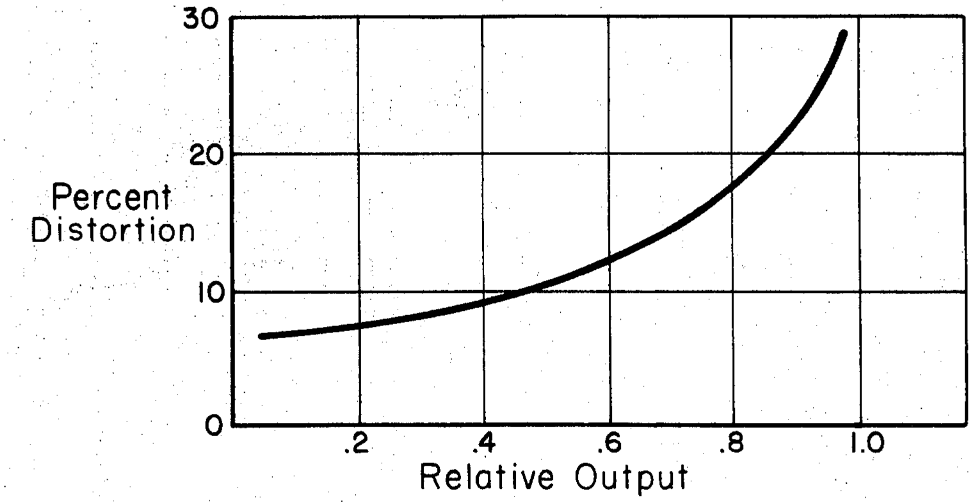
FIG. 3 is a graphical representation of the percent distortion of the output signal of a typical hearing aid amplifier as a function of the output signal level.

FIG. 3 illustrates the percent distortion of the output signal as a function of the relative output signal level for a typical hearing aid amplifier. It should be noted that the values given are for example only, and do not impose any limitation on the invention. As can easily be seen, the amount of distortion stays rather constant until the 0.6 output level is reached, whereupon the distortion increases quite rapidly and becomes intolerable. A typical AGC system for this hearing aid amplifier limits the output to approximately the 0.6 level and thereby prevents the reception of any extraordinarily loud sounds from overdriving the amplifier and presenting a loud, unintelligible sound to the deficient ear. This type of AGC system is not, however, adjustable to respond only to a predetermined frequency range; instead, it provides the same degree of gain control irrespective of the frequency of the incoming signal.

By designing the AGC to limit the output level to some point less than the 0.6 output level for the above example and by making the AGC action frequency selective, in accordance with the invention, a hearing aid amplifier with a new and improved type of AGC action is achieved. Making the AGC action dependent upon only low-frequency sounds, for example, permits the user with a high-frequency hearing deficiency, as previously described, to hear the high-frequency sounds amplified to the greatest possible extent and yet still have the protection from annoying loud bursts of low-frequency sound and enjoy the intelligibility afforded by the amplifier's optimum frequency response capability during normal sound level conditions. Thus, another persons' speech may be amplified to a comfortable level with the greatest degree of intelligibility and still protect the user from, for example, the roar of a jet plane during takeoff.

Figure 4A:
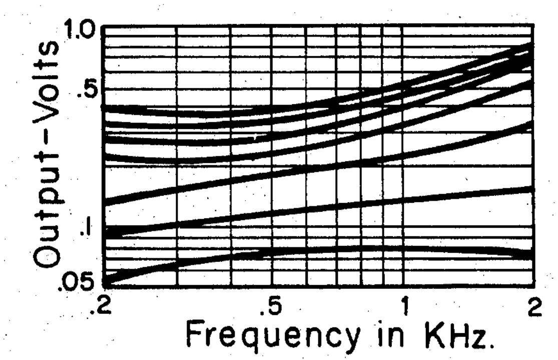
FIGS. 4*a* and 4*b* are graphical representations of the frequency response of the preferred embodiment of the invention shown in FIG. 1 with the AGC system in the high-frequency and low frequency modes, respectively.
Figure 4B:
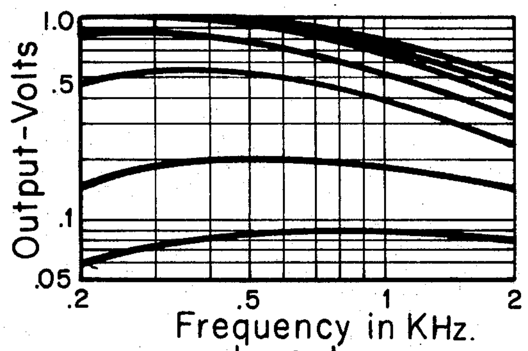

The graphical representations in FIGS. 4*a* and 4*b* illustrate the frequency response characteristics of a hearing aid constructed in accordance with the invention for the high-frequency and low-frequency switch settings or modes, respectively. Again, the values shown are solely for illustration purposes and do not limit the invention in any way. As can be seen in FIG. 4*a*, the low-frequency AGC mode causes the aid to limit the gain at frequencies below 1,000 Hertz; frequencies above 1,000 Hertz are amplified to the full capability of the amplifier. FIG. 4*b*, on the other hand, illustrates the low-frequency AGC mode wherein only frequencies above 1,000 Hertz actuate the AGC system.

Figure 5A:
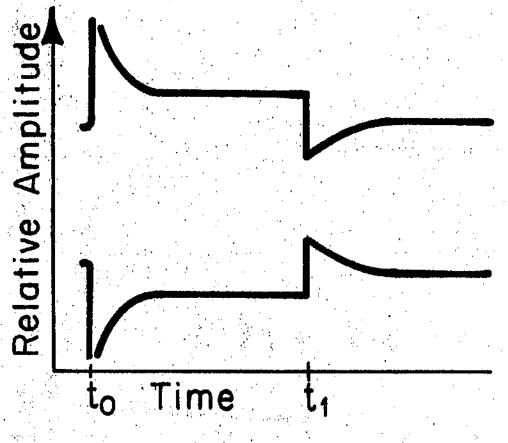
FIGS. 5*a*, 5*b*, 6*a*, 6*b*, 7*a* and 7*b* are graphical representations of the attack and recovery response characteristics of the preferred embodiment of the invention for various AGC modes.
Figure 5B:
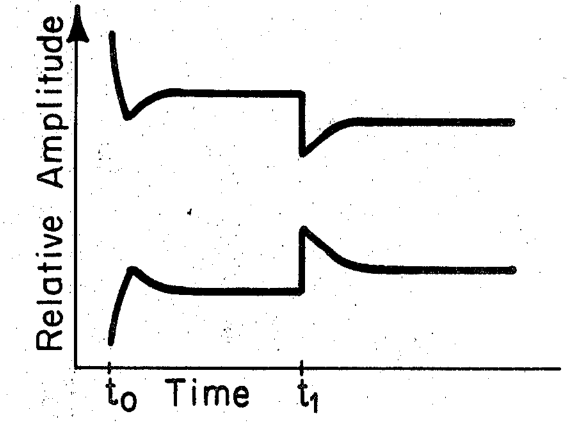
Figure 6A:
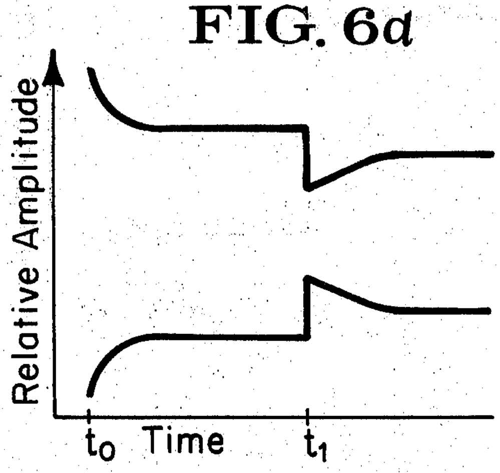
Figure 6B:
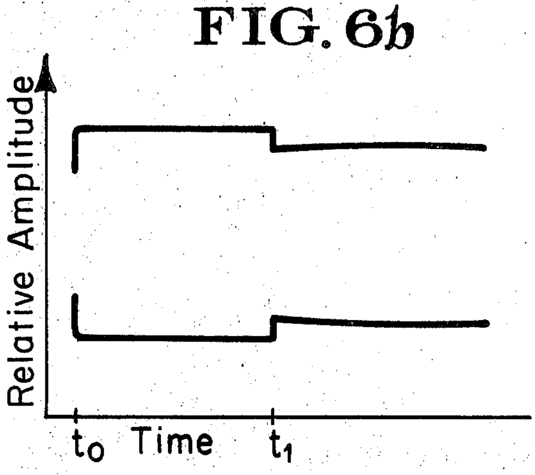
Figure 7A:
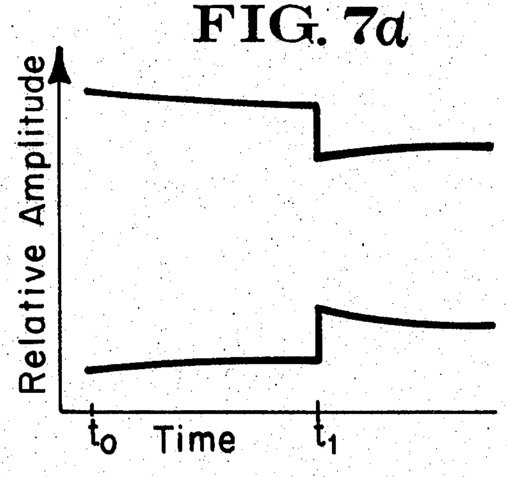
Figure 7B:
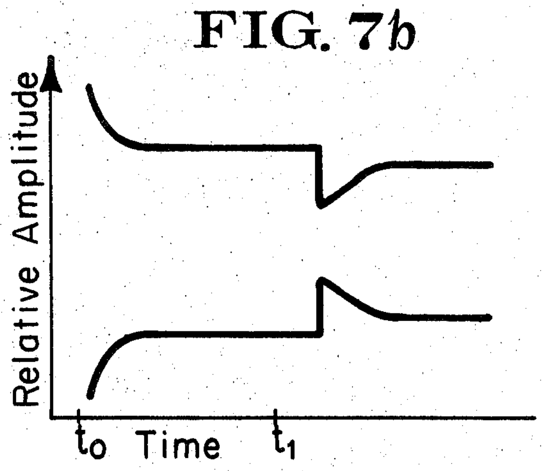

FIGS. 5, 6, and 7 represent oscilloscope traces which illustrate the attack and recovery responses, (*a*) and (*b*) respectively of a preferred embodiment of the invention. FIG. 5 represents the all-frequency AGC mode; FIG. 6, the low-frequency AGC mode; FIG. 7, the high-frequency AGC mode. In each Figure, a single-frequency audio signal of fixed magnitude is applied to the input of the aid. At time equal to $t_0$ and by means of a switching system, the amplitude of this signal is rapidly increased by 10 decibels for approximately 0.2 seconds and then, at time equal to $t_1$, rapidly returned to its original level. The (*a*) Figures depict the response of the aid for an input signal with a frequency of 300 Hz whereas the (*b*) Figures depict the response at 3,000 Hz. It is understood that the graphical representations depicted in these Figures are included by way of example only and that various degrees of control may be achieved by changing the values of the circuit components. The attack and recovery response are important inasmuch as they at least partially determine the degree of intelligibility of the output signal of the hearing aid.

As mentioned previously, hearing deficiencies vary widely from person to person and may represent phenomena which are not completely known. People who have used hearing aids constructed in accordance with the invention have been able to select one of the above-mentioned modes, depending upon their deficiency and/or preference to obtain a degree of intelligibility superior to that provided by conventional hearing aids.

Thus a new and improved hearing aid amplifier has been shown and described which provides a frequency-selective AGC system. The AGC system is constructed such that the user may adjust it to be selectively more responsive to signals of frequencies within a selected portion of the overall frequency response range of the hearing aid than to signals of other frequencies within this overall range. By providing such a system, a user of this hearing aid is able to select a particular AGC mode which permits him to overcome his hearing deficiency with a greater degree of intelligibility than that provided by conventional hearing aids. This system requires only a minimum number of parts, thereby achieving a maximum degree of miniaturization.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A wearable electronic hearing aid comprising:

a microphone for receiving ambient sound waves and converting them to audiofrequency electrical signals;

a transistorized audio amplifier coupled to said microphone for amplifying said electrical signals;

an electromechanical transducer coupled to said amplifier for converting said amplified electrical signals to intelligible audio information at a power level higher than that of said ambient sound waves, said microphone, audio amplifier and transducer being effective to produce amplification of sound waves of frequencies within a predetermined overall audible frequency response range;

an automatic gain control loop coupled to said audio amplifier and responsive to electrical signals of an amplitude greater than a predetermined threshold for developing a control effect proportional to said amplitude and for utilizing said control effect to control the gain of said audio amplifier for signal amplitudes above said threshold;

and frequency-selective means included in said automatic gain control loop comprising:

a. a pair of series-connected capacitors interposed in said loop;

b. a third capacitor adapted to be connected between said capacitor pair and a plane of reference potential;

c. and switch means connected to said capacitors and having a first position for selectively shorting one of said capacitor pair, a second position for selectively connecting said third capacitor to said reference potential plane, and a third position for both shorting one of said capacitor pair and connecting said third capacitor to said reference potential plane, thereby providing low-frequency AGC, high-frequency AGC, and all-frequency AGC as desired.